Jan. 30, 1934. C. W. MARSH 1,945,151
PISTON
Original Filed June 1, 1931
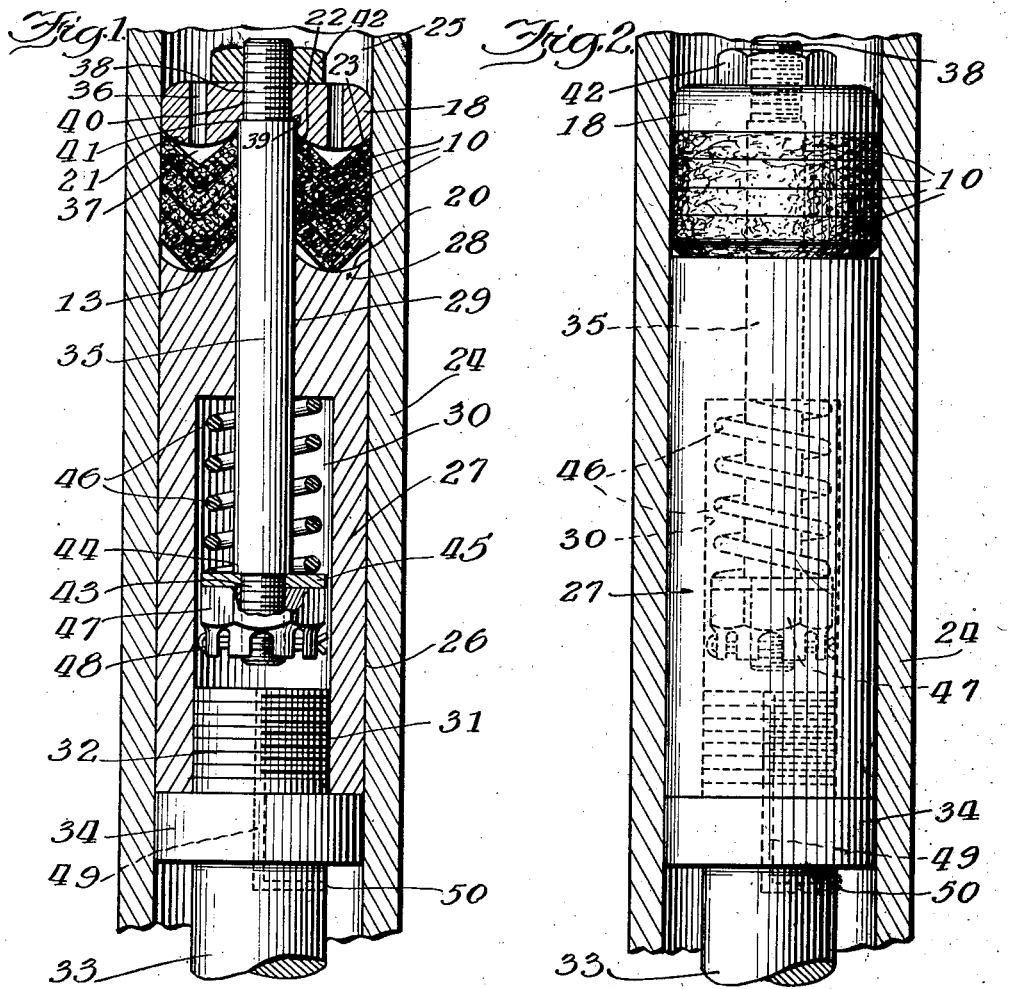
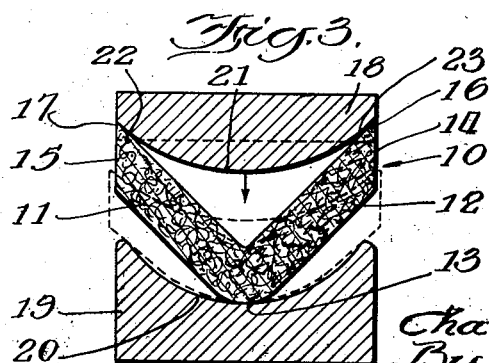

Patented Jan. 30, 1934

1,945,151

UNITED STATES PATENT OFFICE 1,945,151

PISTON

Charles W. Marsh, Muskegon, Mich.

Original application June 1, 1931, Serial No. 541,301. Divided and this application June 6, 1932. Serial No. 615,633

9 Claims. (Cl. 309—34)

The present invention relates to pistons, and is particularly concerned with pistons of the type adapted to be employed in a cylinder for use in pumps, air compressors, hydraulic rams, air hoists, air chucks, railway air brakes, automobile brakes, door checks and myriad other uses.

One of the objects of the invention is the provision of an improved cylinder and piston arrangement in which the piston is adapted to run idle without excessive tension or wear on the packing devices employed with the piston.

Another object is the provision of an improved piston in which the expansion of the packing devices is controlled and regulated by the amount of fluid pressure acting upon the piston, so that compensation is made for the increased tendency to leak past the packings under high pressure.

Another object is the provision of a piston of the class described, in which all of the moving parts are suitably arranged to prevent leakage of any kind past the piston under low pressures or high pressures, and which is adapted to maintain a constant pressure without substantial leakage, for long periods of time.

Another object is the provision of a piston of the class described, which is adapted to prevent the building up of a pressure behind the packings, such as might tend to offset the compensating action of the high fluid pressure in the cylinder.

Another object is the provision of an improved piston of the class described, which is capable of long and continuous service without necessity for repacking.

Another object is the provision of a high pressure packing which is particularly adapted to be used in hydraulic machinery under extremely high pressures, and which will operate efficiently under such pressures for an extremely long life.

Another object is the provision of an improved piston which is peculiarly adapted to be utilized as a hydraulic ram and which is adapted to maintain a fluid-tight joint for a long period of time under the most adverse conditions.

The present application is a division of my parent application, Serial No. 541,301, filed June 1, 1931, on pistons, and relates particularly to one of the embodiments disclosed in Fig. 4 of said parent application.

Other objects and advantages of the invention will be apparent from the following description and from the accompanying drawing, in which similar characters of reference indicate similar parts throughout the several views.

Referring to the single sheet of drawing:

Fig. 1 is a sectional view of a cylinder and a piston taken on a plane passing through the axis of the cylinder and piston;

Fig. 2 is an elevational view of the piston with the cylinder in section; and

Fig. 3 is a diagrammatic cross sectional view taken through one of the packings, the packing seat, and the expander, employed in the present piston, showing the expanding action which takes place in the packing.

Referring to Figs. 1 and 2, the packings which are utilized in the present improved piston preferably consist of closed rings or molded leather members having a substantially V-shaped cross section, as shown in Fig. 3.

While the closed leather rings are preferred for the reason that there is less possibility of leakage than where a split ring is employed, split rings formed of strips of the same material of V-shaped cross section, with the ends of the strip in abutting relation, may also be utilized where a plurality of packings are employed, and in such case the joints in the respective rings are preferably staggered with respect to each other.

The packing rings, indicated by the numeral 10, may also be arranged in the form of a helix, of which the separate turns constitute the various rings, but in such case the expander and seat should be formed of a shape complementary to the ends of a helix of packing of this type, in order that the expander and seat may come into engagement with the packing about the full periphery of the piston.

The packing rings 10 are preferably provided with a pair of frusto-conical flanges 11 and 12 joined together at the apex 13 along the line of a circular forme packing of substantially V shape.

A helical strip of V-shaped packing may also be employed with expanders of the type illustrated, provided the ends of the helix are beveled off very gradually to a sharp point so that there is no offset at the end of the helix.

The edges 14 and 15 of the packing are preferably beveled to form substantially sharp edges or lips 16, 17, the edges 14 and 15 being substantially cylindrical in shape and concentric with each other. When a number of turns or rings of V-shaped packing are employed, the packings are nested in each other, as shown in Fig. 1, the inside of each lower packing engaging the outside of the next adjacent packing. Each ring of packing is thus supported by the adjacent rings of packing, and all of the rings are expanded together at the same time.

The packings are preferably actuated by a pair of members 18, and 19, acting as the expander and packing seat, respectively, and located above and below the packings, said member 19 preferably comprises a concave surface 20 formed on one end thereof and engaging the apex 13 of the packing.

The concave annular groove 20 is of less depth than the altitude of the V-shaped section of the ring, so that the member 19 initially engages the apex 13 of the packing and through the inter-engagement of the successive layers of packing is adapted to support the apices in predetermined position as the flanges are forced downward.

The expansion member 18 is preferably provided with a convex packing engaging surface 21, which is of less height than the altitude of the V-shaped section of one of the packing rings, so that the convex surface of the metal expansion ring initially engages the lower inside edges 22, 23 of the adjacent packing ring. Through the inter-engagement of the packing ring 10 with the other packing rings, the upper expansion member 18 is adapted to force outward all of the outer edges of the packing rings which are nested together.

Referring to Fig. 3, this is a diagrammatic illustration of the expanding action of the members 18 and 19 on the packing rings, and, while a single packing ring is illustrated in Fig. 3 for the purpose of clarity, the action is the same when a plurality of packing rings are employed, and the packing rings are nested together, as shown in Fig. 1.

The full line illustration of the packing 10 shows the same in its normal position seated on the member 19, and before pressure is applied thereto by the expanding member 18 to effect a relative movement of the expansion members, such as the movement of the upper expansion ring in the direction of the arrow, the apex 13 is forced toward the sharp edges 16 and 17. Since the width of the flanges 11, 12 is greater than the space between the opposite edges 14 and 15, the packing is expanded edgewise to the position shown in the dotted lines in Fig. 3.

The concavely curved surface 20 of the seat 19 and the convexly curved surface 21 of the expansion member 18 are preferably such that when the packing is fully expanded the said expansion member and seat engage and reinforce the V-shaped leather packing to hold it in predetermined position and prevent the packing from any bending action under the influence of the frictional engagement between the packing and the wall of the piston. The rings are thus prevented from slithering back and forth where the packing is employed in a reciprocating member, but are adapted to take up the wear and maintain a fluid-tight joint at all times.

The packing is preferably arranged so that the pressure is greater on the inside of the V-shaped packing than on the outside, that is, at the top of Fig. 3 the greater pressure is applied so that the fluid pressure tends to force the sharp edges 16, 17 into closer engagement with the walls of the cylinder.

Referring to Figs. 1 and 2, the piston illustrated in these figures is provided with V-shaped packings of the type just described, and any number of packings may be employed.

The cylinder 24 is provided with an inner cylindrical surface 25 substantially complementary to the outer cylindrical surface 26 of a piston 27. The piston 27 has its upper end 28 formed with a convex annular surface 20 similar to that of the seat 19, and it will be evident that the upper end of the piston constitutes the seat for the packings.

The piston is provided with an axially extending bore 29 communicating with a concentrically located counterbore 30, and the end of the counterbore 30 may be threaded as at 31 for receiving the threaded end 32 of piston rod 33, which may be provided with an annular flange 34 for engaging the end of the piston 27. The bore 29 in the piston 27 slidably receives a plunger or rod 35 which movably supports the upper expansion member 18 for engagement with a multiplicity of packings 10. The upper expansion member 18 is provided with an annular convex surface 21 previously described, and it is also preferably provided with a plurality of apertures 36 for providing communication between the interior of the piston 25 and the space 37 below the expansion ring adjacent the packings 10. The plunger 35 is preferably provided with a reduced threaded upper end 38, thereby forming an annular shoulder 39, and the upper expansion member may be provided with a bore 40 for receiving the reduced end 38 and with a counterbore 41 for receiving the upper portion of the rod 35.

The nut 42 may be threaded on the upper end of the rod 35 to secure the expansion member 18 in place, or in some forms of the invention other types of securing devices may be employed.

The lower end of the rod 35, in Fig. 1, is also provided with a reduced threaded portion 43, forming an annular shoulder 44, against which may be seated a washer 45, which fits about the reduced portion 43 and provides a seat for a helical coil spring 46. The nut 47 on the threaded end 43 secures the washer 45 in place against the annular shoulder 44, and the cotter-pin 48 assures the fixity of the nut 47, the cotter-pin passing through an aperture in the reduced end 43. A similar cotter-pin may be employed at the upper end, if desired.

It will be observed that the expansion ring 18 initially engages the inside of the packing assembly at the points 22 and 23 while the surface 20 initially engages the apex 13 of the lowermost packing, and the expansion member therefore tends to expand the packings 10, in Fig. 1, exactly as described with respect to Fig. 3.

The spring 46 is under initial compression and tends to draw the rod 35 downward to urge the expansion member and seat toward each other, and the spring 46 constantly tends to effect expansion of the packings 10 to take up any wear and maintain a fluid-tight joint.

The pressure in the cylinder 24 above the piston 27 also tends to force the flanges 11 and 12 of the packing into closer engagement with the walls of the cylinder, and it will be noted that the packing not only provides a fluid-tight joint between the piston and the cylinder, but between the piston and the plunger rod 35.

The counterbore 30 is preferably placed in communication with the atmosphere by a conduit 49, which extends downward through the threaded plug 32, and piston rod 33, and communicates with the atmosphere at the point 50. Where pistons of the type described are used for continuous service or for the purpose of maintaining a pressure in the cylinder 24, a slight degree of leakage past the packings 10 may be expected, and this leakage would pass down the bore 29 into the counterbore 30 and would otherwise build up in the counterbore 30 if means were not provided, such as the conduit 49, for releasing this pressure. The building up of fluid pressure below the packing 10 or in the counterbore 30 would render the packing ineffective, and therefore the piston is preferably provided with fluid pressure release means, such as conduit 49.

The packing rings in devices constructed according to the present invention may also consist of alternate rings of felt and leather of the same shape, or occasional felt rings may be incorporated, the felt rings being impregnated with oil or solid grease so that they are adapted to continuously lubricate the packed joint, but the packing rings themselves are preferably constructed of the best leather, treated with oils or greases adapted to withstand the acids, fluids, heat, and other agencies to which the particular rings may be subjected.

The operation of the present piston will be evident from the description of its construction and the functions of its parts previously described.

One of the most important features of the piston is the fact that an increase of pressure on the pressure side of the piston tends to expand the packings into firmer engagement with the walls of the cylinder and with the parts of the piston which might otherwise leak, such as the plunger 35.

This enables the piston to adjust its sealing action to the force or pressure which is placed upon it, and the piston may run free or idle without any substantial wear on the packing because no great amount of pressure is placed upon the piston while it is idling. As soon as the piston starts to do effective work, however, the increase in pressure in the cylinder increases the tendency of the packings to prevent leakage.

It will thus be observed that I have invented an improved form of piston in which the sealing action of the packings is increased by the pressure in the cylinder in which the piston is mounted. The pressure not only effects an expansion of the packing at the outer surface of the piston, but of the packings surrounding it, and the present pistons are capable of maintaining high pressures without leakage for long periods of time without any necessity for repacking the pistons.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A hydraulic ram piston comprising a cylindrical body having a bore passing through the same, and having an annular concavely formed packing seat, a plunger mounted in said bore, a plurality of layers of substantially V-shaped leather packings about the end of said plunger, and adapted to engage the wall of a cylinder in which said piston is mounted, said packings having the apex of one end packing in initial engagement with the packing seat, and an expander carried by the end of said plunger and having a convex annular surface engaging the inside of the flanges of the other end packing adjacent its edges, the expansion of said packings being increased responsive to increase of fluid pressure on the piston plunger.

2. A hydraulic ram piston comprising a cylindrical body having a bore passing through the same, and having an annular concavely formed packing seat, a plunger mounted in said bore, a plurality of layers of substantially V-shaped leather packings about the end of said plunger, and adapted to engage the wall of a cylinder in which said piston is mounted, said packings having the apex of one end packing in initial engagement with the packing seat, an expander carried by the end of said plunger and having a convex annular surface engaging the inside of the flanges of the other end packing adjacent its edges, the expansion of said packings being increased responsive to increase of fluid pressure on the piston plunger, and a spring carried by the other end of said plunger and reacting against said plunger and said piston to draw said expander against said packings.

3. A hydraulic ram piston comprising a cylindrical body having a bore passing through the same, and having an annular concavely formed packing seat, a plunger mounted in said bore, a plurality of layers of substantially V-shaped leather packings about the end of said plunger, and adapted to engage the wall of a cylinder in which said piston is mounted, said packings having the apex of one end packing in initial engagement with the packing seat, an expander carried by the end of said plunger and having a convex annular surface engaging the inside of the flanges of the other end packing adjacent its edges, the expansion of said packings being increased responsive to increase of fluid pressure on the piston plunger, a spring carried by the other end of said plunger and reacting against said plunger and said piston to draw said expander against said packings, said piston having a counterbore surrounding said spring, and a connecting rod secured in said counterbore, said counterbore communicating with the atmosphere through a bleeder conduit to prevent building up of pressure in said counterbore.

4. In a piston, the combination of a supporting body which is provided with an upper concave annular surface, said body having an outer cylindrical surface and having an axial bore extending into said body, said concave annular surface extending radially from said outer cylindrical surface to the edge of said bore, a plunger slidably mounted in said axial bore and carrying at its end an expansion member having a lower convex annular surface, and a plurality of packings comprising flexible impermeable members, each provided with a pair of frusto-conical flanges, said flanges of each packing being joined together along the line of a circle to form a substantially V-shaped member having beveled edges, the outer edges of said packings being adapted to engage the walls of a cylinder, and the inner walls of said packings engaging said plunger, whereby the joint between said plunger and said piston is sealed against leakage and said plunger is actuated responsive to increased fluid pressure on one end of said plunger.

5. In a piston, the combination of a supporting body which is provided with an upper concave annular surface, said body having an outer cylindrical surface and having an axial bore extending into said body, a plunger slidably mounted in said axial bore and carrying at its end a circular member having a lower convex annular surface, and a plurality of packings comprising flexible impermeable members, each provided with a pair of frusto-conical flanges, said flanges of each packing being joined together along the line of a circle to form a substantially V-shaped member having beveled edges, the outer edges of said packings being adapted to engage the walls of a cylinder, and the inner walls of said packings engaging said plunger, said circular member initially engaging the packings adjacent their outer edges inside the V-shaped members, and said lower concave annular surface initially engaging the apex of said packing assembly, whereby said packings are expanded into engagement with the walls of a cylinder and with said plunger by pressure inside the cylinder.

6. In a piston, the combination of a supporting body which is provided with an upper concave annular surface, said body having an outer cylindrical surface and having an axial bore extending into said body, a plunger slidably mounted in said axial bore and carrying at its end a circular member having a lower convex annular surface, and a plurality of packings comprising flexible impermeable members, each provided with a pair of frusto-conical flanges, said flanges of each packing being joined together along the line of a circle to form a substantially V-shaped member having beveled edges, the outer edges of said packings being adapted to engage the walls of a cylinder, and the inner walls of said packings engaging said plunger, said circular member initially engaging the packings adjacent their outer edges inside the V-shaped members, and said lower concave annular surface initially engaging the apex of said packing assembly, whereby said packings are expanded into engagement with the walls of a cylinder and with said plunger by pressure inside the cylinder, said circular member having a plurality of apertures providing an access into the interior of the cylinder and the interior of the V-shaped packing assembly to utilize the effect of fluid pressure on the packing.

7. In a piston, the combination of a supporting body which is provided with an upper concave annular surface, said body having an outer cylindrical surface and having an axial bore extending into said body, a plunger slidably mounted in said axial bore and carrying at its end a circular member having a lower convex annular surface, and a plurality of packings comprising flexible impermeable members, each provided with a pair of frusto-conical flanges, said flanges of each packing being joined together along the line of a circle to form a substantially V-shaped member having beveled edges, the outer edges of said packings being adapted to engage the walls of a cylinder, and the inner walls of said packings engaging said plunger, said circular member initially engaging the packings adjacent their outer edges inside the V-shaped members, and said lower concave annular surface initially engaging the apex of said packing assembly, whereby said packings are expanded into engagement with the walls of a cylinder and with said plunger by pressure inside the cylinder, and resilient means reacting against said piston and tending to draw said plunger in a direction to force said circular member toward said piston to maintain said packings under a predetermined expanding influence at all times.

8. In a hydraulic ram, the combination of a piston, said piston having a plurality of packings disposed at one end, with a circular member mounted on a plunger in said piston projecting through and sliding with respect to said packings to cause said annular member to engage the pressure side of said packings, and means for releasing the pressure caused by leakage of fluid past said packings about said plunger to prevent fluid pressure from building up on the side of said packings opposite from the pressure chamber of said cylinder.

9. In a piston, the combination of a supporting body which is provided with an upper concave annular surface, said body having an outer cylindrical surface and having an axial bore extending into said body, a plunger slidably mounted in said axial bore and carrying at its end a circular member having a lower convex annular surface, and a plurality of packings comprising flexible impermeable members, each provided with a pair of frusto-conical flanges, said flanges of each packing being joined together along the line of a circle to form a substantially V-shaped member having beveled edges, the outer edges of said packings being adapted to engage the walls of a cylinder, and the inner walls of said packings engaging said plunger, said circular member initially engaging the packings adjacent their outer edges inside the V-shaped members, and said lower concave annular surface initially engaging the apex of said packing assembly, whereby said packings are expanded into engagement with the walls of a cylinder and with said plunger by pressure inside the cylinder, said circular member having a plurality of apertures providing access from the interior of the cylinder to the interior of the V-shaped packing assembly to utilize the effect of fluid pressure on the packing, one of said packings comprising a felt member of similar V shape impregnated with solid lubricating material to maintain the lubrication of said packings.

CHARLES W. MARSH.